United States Patent [19]

Bellet

[11] 4,371,271
[45] Feb. 1, 1983

[54] ELECTRONIC THERMOMETER

[75] Inventor: Jean-Marie Bellet, Geneva, Switzerland

[73] Assignee: Bioself International Inc., Nassau, The Bahamas

[21] Appl. No.: 156,447

[22] Filed: Jun. 4, 1980

[30] Foreign Application Priority Data

Jun. 7, 1979 [CH] Switzerland ............ 5337/79

[51] Int. Cl.³ .................................... G01K 07/22
[52] U.S. Cl. ...................................... 374/183; 331/66; 374/163; 374/208
[58] Field of Search ............... 73/362 AR, 362.4, 344, 73/342; 331/66

[56] References Cited

U.S. PATENT DOCUMENTS

| 2,017,859 | 10/1935 | Halstead ............................ 73/362 R |
| 3,100,397 | 8/1963 | Peltola ............................. 73/362.4 X |
| 3,355,949 | 12/1967 | Elwood et al. ....................... 75/345 |
| 3,707,873 | 1/1973 | Young ............................ 331/66 X |
| 3,715,911 | 2/1973 | Chuan ............................ 73/23 X |
| 3,872,728 | 3/1975 | Joyce et al. ...................... 73/362 AR |
| 3,954,007 | 5/1976 | Harrigan .......................... 73/339 C |
| 4,009,615 | 3/1977 | Ruhl ............................. 73/362 AR |
| 4,030,363 | 6/1977 | Halleck .......................... 73/362 AR |
| 4,110,746 | 8/1978 | Furakawa et al. ........ 73/362 AR X |
| 4,122,719 | 10/1978 | Carlson ............................ 73/342 |
| 4,125,023 | 11/1978 | Amemiya et al. ............ 73/362 AR |
| 4,150,573 | 4/1979 | Iinuma et al. ................. 73/362 AR |
| 4,206,648 | 6/1980 | Tuska ............................. 331/66 X |

Primary Examiner—Daniel M. Yasich
Attorney, Agent, or Firm—Trexler, Bushnell & Wolters, Ltd.

[57] ABSTRACT

An electronic thermometer comprises a temperature sensitive resistance element to be placed in contact with the area of which the temperature is to be measured. A first relaxation oscillator to which the resistance element belongs, provides a frequency depending on the temperature to be measured. A reference oscillator provides a reference frequency. The first frequency is counted in a counter during a period provided from the reference frequency by a divider. If a temperature or power supply drift affects the reference frequency, the same drift affects in the same direction the counted frequency, so that during the counting the effect of the drift is substantially cancelled. A memory and a comparator record the result of the counting only if it is higher than the preceding result, so that the thermometer operates as a maximum thermometer. The recorded result is provided to a decoder which controls a display device.

5 Claims, 4 Drawing Figures

ELECTRONIC THERMOMETER

BACKGROUND OF THE INVENTION

The invention relates to an electronic thermometer. The conventional mercury thermometer gives in general a satisfying precision but presents various disadvantages. In particular, a mercury thermometer is sometimes difficult to read and hence presents some risk of error. There have been prior efforts to replace the mercury thermometer by electrical or electronic temperature measuring devices.

For example, the thermocouple is known; in use, one of the two weldings of the thermocouple is placed in contact with the area of which the temperature is to be measured, and the other welding is put in a medium kept at a precise, known reference temperature. For example, melting ice under normal pressure, provides the reference temperature of 0° C. The measurement of the voltage between the two weldings indicates the difference of temperature between the weldings, which allows calculation of the temperature to be measured by comparison with the reference temperature. However, the necessity of providing such a reference temperature is an inconvenience.

Another known method uses the fact that the usual resistive elements have a resistance varying with the temperature. It is also known that semi-conductors such as diodes and transistors, present characteristics which depend on the temperature. Further, resistive elements are available on the market which have a resistance which varies substantially over a specified range with the temperature, according to a characteristic, either positive or negative, but usually the elements with negative characteristics are used. A method for measuring the temperature utilizing such elements usually comprises the measuring of the current traversing such an element under a given voltage to derive its resistance or impedance and hence its temperature. There are alternative methods, but all present the same inconvenience of requiring a voltage or current reference sourch which is very stable and very precise.

OBJECTS AND SUMMARY OF THE INVENTION

The present invention aims at providing an electronic thermometer which does not require either a medium kept at a reference temperature, or a reference current or voltage source presenting a high precision and a good stability.

The apparatus according to the invention includes, arranged in the vicinity of each other, two oscillators of similar construction, except that the first one is connected to a remote temperature sensing resistive element, and thus provides a frequency $f_x$ depending on the temperature to be measured $T_x$. This frequency $f_x$ is measured by counting the cycles thereof during a period depending upon the reference frequency $f_r$ of the second oscillator. This frequency $f_r$ may present a drift due to a fluctuation of the temperature $T_a$ of the circuits of the second oscillator, or to a fluctuation of the power supply. But because both oscillators are neighbors and similar, the frequency $f_x$ is also submitted to a corresponding drift, so that finally, when counting, the effect of the drift is substantially cancelled.

In contrast, conventional systems of this type have heretofore required both a reference frequency which is perfectly stable and, the elimination in the first oscillator of any fluctuation other than those coming from the measuring resistive element. This latter requirement further requires a perfectly stabilized power supply and a circuit carefully compensated in temperature or, if possible, arranged in a housing where the temperature is controlled by thermostat. Such a solution would require a complex and expensive device and would present all the disadvantages mentioned previously. The apparatus according to the invention provides, in a relatively simple and inexpensive way, a degree of precision which would otherwise require such complex and expensive means.

The apparatus according to the invention may also be combined with electronic compensation circuits for drifts of either the temperature or the power supply, providing that these circuits are applied symmetrically with respect to both oscillators. In this case, the advantages of the two arrangements are cumulated, thus enhancing the precision obtained.

Accordingly, the apparatus according to the invention allows either attainment of a given precision with relatively simple circuits, or substantial improvement of the precision obtained by circuits already provided so as to further reduce the adverse effect of the drifts and enhance precision. That is, the apparatus according to the invention permits either the design of even more precise equipment, for a given complexity, than that of the prior art, or the use of simpler and more practical equipment still providing quite a satisfactory precision. The electronic thermometer according to the invention may be used as a laboratory instrument, a meteorological measuring instrument, a medical thermometer, etc. The fact that the measurement is obtained in a digital form presents of course a considerable advantage with respect to analog measurements, since the result may be displayed in a very readable manner, and may possibly be recorded as data information in the form of a digital signal.

BRIEF DESCRIPTION OF THE DRAWINGS

The invention will be better understood by means of the following description of the illustrated embodiments with reference to the drawings wherein.

DETAILED DESCRIPTION OF THE ILLUSTRATED EMBODIMENTS

Figure 1:
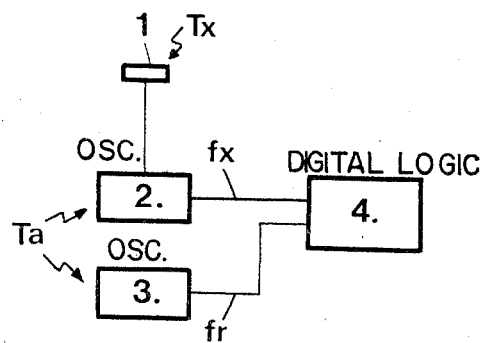
FIG. 1 represents diagrammatically the principle of an electronic thermometer according to the invention.

An electronic thermometer according to the present invention comprises, as shown in FIG. 1, a temperature sensitive element 1 intended to be put in contact with the area of which the temperature $T_x$ is to be measured. This temperature sensitive element 1 comprises a resistance of variable value, depending on $T_x$. A measuring oscillator 2 is coupled with the temperature sensitive element 1 and produces a frequency $f_x$, also depending on $T_x$. A reference oscillator 3 provides a reference frequency $f_r$. The oscillators 2 and 3 are located immediately adjacent each other and are similar, except for the fact that the first one is coupled with the resistive element 1, remote from the oscillators. Both oscillators 2 and 3 have therefore in principle the same ambient temperature $T_a$, most often the room temperature, and they receive the same electrical power supply. In this way, if a drift or variation in either the temperature or the power supply affects the frequency $f_r$, the same drift affects the frequency $f_x$ in the same direction. Both frequencies $f_r$ and $f_x$ are provided to a digital circuit 4, of which the operation is similar to that of a digital logic circuit, and hence relatively immune to any such drifts. In these circuits 4, the frequency $f_x$ is compared to the frequency $f_r$, the effect of any such drift being substantially cancelled in this comparison.

Figure 2:
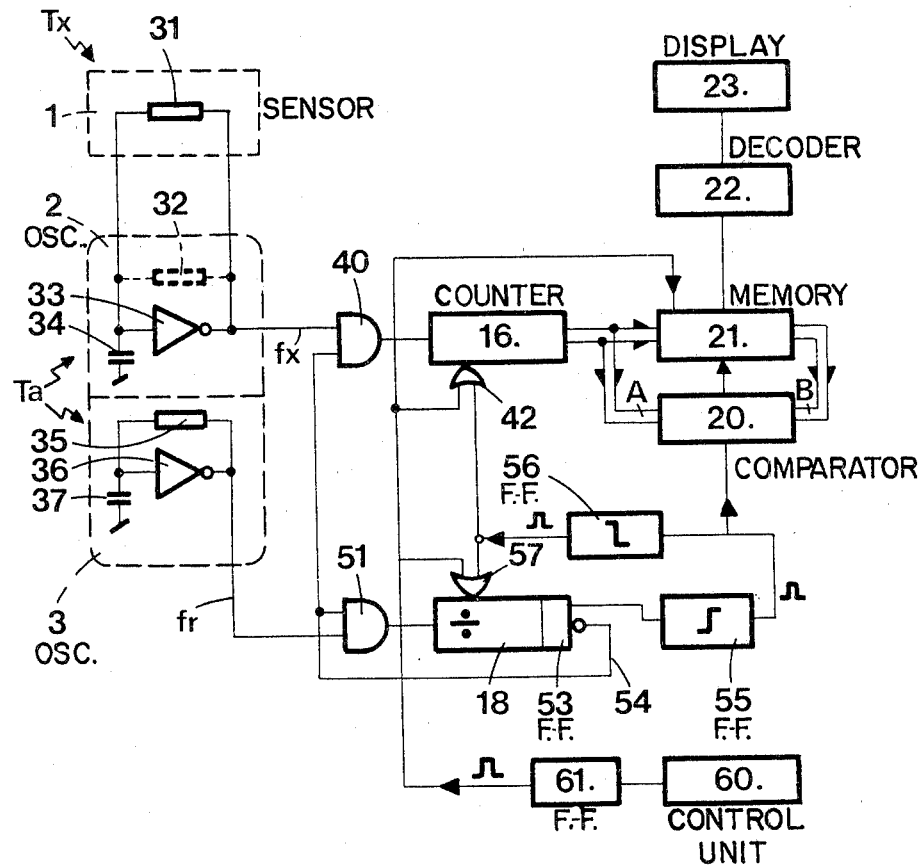
FIG. 2 represents diagrammatically the circuits of such an electronic thermometer.

In the circuits represented in FIG. 2, the temperature sensitive element 1 comprises a temperature responsive resistor or NTC 31. In the illustrated embodiment, this NTC 31 has a rated value of 600 K. ohms, with a characteristic of 5%/°, namely 30 K. ohms/° about its rated value. This NTC 31 is connected to the circuit of the oscillator 2 which is a relaxation oscillator formed by an inverter trigger 33 and an RC network comprising a capacitor 34 and a resistor 32 in parallel with the NTC 31. The resistor 32 is optional, particularly in the case where the NTC 31 has a good linear characteristic in the working range. The oscillator 2 provides logic pulses with a frequency $f_x$ depending on the temperature $T_x$. These pulses pass, via an AND gate 40 into a counter 16.

The reference oscillator 3 is of similar construction to the first oscillator 2 and located immediately adjacent thereto. This oscillator 3 comprises an inverter trigger 36 and an RC network with a capacitor 37 and a resistor 35. The reference oscillator 3 has a frequency $f_r$ of the same order of magnitude as $f_x$, for example $f_r$ being the geometrical mean between the maximum and the minimum of the working range of $f_x$. This frequency $f_r$ is provided, via an AND gate 51 to a divider 18 which divides it by a number representing the inverse of the relative precision required for the measurement. For example, it may be supposed that $f_x$ is on the order of 100,000 Hz, $f_r$ being taken equal to 100,000 Hz, and that a precision of 1 millionth is desired for the counting of the frequency $f_x$. The divider 18 then divides the frequency by a factor of 1 million or close to 1 million, for example $2^{20}$; ($2^{10}=1024$). The divider 18 is ended by a flip-flop 53 stage of which the inverted output controls through a line 54 a pair of AND gates 40 and 51, and of which the non-inverted output controls two successive monostable flip-flops 55 and 56, the first one provided for the entry of the result of the counting, and the second one provided for the reset. The output of the second flip-flop 56 is provided to a pair of OR gates 42 and 57 which control the reset inputs of the counter 16 and of the divider 18 respectively. The counter 16 is connected to a memory 21 and to a first input A of a comparator 20, the second input B of this comparator being connected to the memory 21.

The content of the memory 21 is provided to a decoder 22 controlling a display device 23. The decoder is arranged to convert the numeric content of the memory 21, which corresponds to an arbitrary unit system depending on the circuit arrangement, into a numeric content corresponding to a usual temperature unit system, and to convert this numeric content into display control signals. Any required calibration may be accomplished at the decoder 22. Calibration could also be accomplished at the frequency divider 18 or at the oscillators 2 and 3, but it is preferable to provide for calibration at the logic and digital circuits rather than at analog circuits.

The circuit further comprises a control and power unit 60 which includes merely a conventional on-off switch and a battery (not shown) that is operationally capable of supplying electrical power to operate the circuits. Among various functions, the unit 60 has the function of initial reset of the counter 16, of the divider 18 and of the memory 21. For this purpose, the unit 60 controls a monostable flip-flop 61 of which the output is connected to a reset input of the memory 21, and to two OR gates 42 and 57 controlling the reset inputs of the counter 16 and of the divider 18, respectively. The operation of the circuits of FIG. 2 is as follows:

When the thermometer is used, the circuit 60 supplies and operates the circuits and actuates the flip-flop 61 which effects the initial reset of the counter 16, of the divider 18 and of the memory 21. Both oscillating circuits 2, 3 provide respectively their frequencies $f_x$ and $f_r$. When the divider 18 has achieved one cycle, its final stage 57 is set on logic "1" level and the line 54 inhibits the AND gates 40 and 51, blocking the counting. At the same time, the first monostable flip-flop 55 sends a control pulse, actuating the comparator 20. If the content of the counter 16 is higher than the content of the memory 21, the content of the counter is stored in the memory 21. At the end of the pulse of the first monostable flip-flop 55, the second monostable flip-flop 56 sends a pulse for resetting the counter 16 and the divider 18, including its terminal stage 53, which again activates the AND gates 40 and 51 so that a new measuring cycle starts.

If the measurement of the new cycle gives a still higher result, in other words if the temperature $T_x$ has increased, then the action of the comparator records this latter value. The thermometer operates therefore as a maximum thermometer.

It is to be noted that the reference oscillator 3 is located immediately adjacent to the measuring oscillator 2 and the two are quite similar in their construction, except for the NTC element 31. Further, they receive the power supply from the same source. Being neighbors, they have in principle the same ambient temperature $T_a$. Therefore, if the frequency $f_x$ of the first oscillator, a function of the measured temperature $T_x$, is further influenced by a thermal drift or a power supply drift acting on the oscillator 2, the reference frequency $f_r$ is affected in the same direction and by the same drift acting on the reference oscillator 3. Consequently, if for example such a drift slows down $f_x$, it will slow down $f_r$ in the same proportion which will increase the counting duration, so that finally the effect of the drift will be cancelled.

Figure 3:
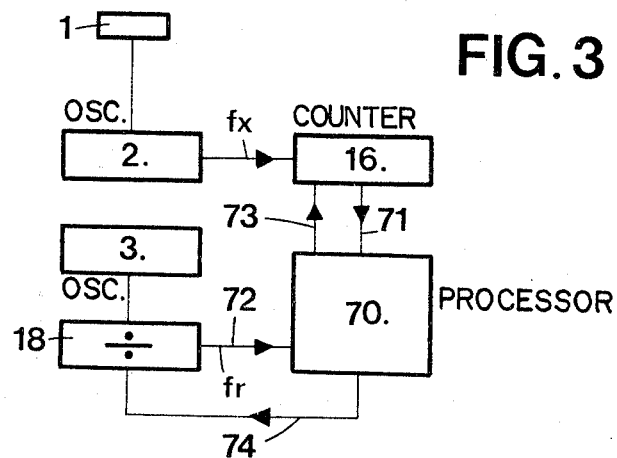
FIG. 3 shows diagrammatically the circuit of another embodiment of the electronic thermometer of the invention.

The logic part of the circuit of FIG. 2 is made from relatively simple elements such as counters, gates, resistors. However, for the logic functions of the circuit of FIG. 2, or for more complex functions, it may be preferable to use a microprocessor. In the circuit of FIG. 3, the temperature sensitive element 1 is shown connected to the measuring oscillator 2, which is connected to the counter 16, and the reference oscillator 3 is connected to the divider 18. The circuit 70 is a microprocessor circuit controlling the counter 16 and the divider 18, particularly for reset, through the lines 73 and 74 respectively. The microprocessor circuit 70, on the other hand, receives input signals from the circuits 16 and 18 on its lines 71 and 72.

The microprocessor circuit 70 may be arranged to effect a comparison function in order to keep only the higher measured temperature. It could also be arranged to assume more complex functions, for example, recording of the maximum and the minimum, as well as storage of a temperature curve as a function of time. The microprocessor circuit 70 may also control directly a display device without the intermediary use of a decoder. This circuit could also be easily used for a calibration effected during production, this calibration being done in the form of a modification of the content of the memory or of modifications of logic connections, which is preferable to an analog calibration. Moreover, an appropriate microprocessor circuit could be used for control of the counter 16 and the divider 18.

Figure 4:
FIG. 4 shows the outer aspect of an embodiment of the electronic thermometer including a casing in which the electrical circuits of FIG. 2 are located.

FIG. 4 shows an exemplary embodiment of a medical electronic thermometer. The temperature sensitive element 1 is positioned at the end of an elongated extension of the thermometer body. The circuit of FIG. 2 or of FIG. 3 is enclosed in said body. On the side of the thermometer, the display device is located, on which appears the indication 38.65° C. A six-cell display of the "seven segments" type, with separation point for the decimal, permits the display of temperature in hundredths, also showing the selected unit, here °C.

While preferred embodiments have been illustrated and described herein, the invention is not limited thereto. On the contrary, various alternatives, changes or modifications may become apparent to those skilled in the art from the foregoing. Such alternatives, changes, and modifications are to be considered as forming a part of the invention, insofar as they fall within the spirit and scope of the appended claims.

The invention is claimed as follows:

1. An electronic thermometer comprising: a temperature sensor comprising a remotely located variable resistance element whose resistance value varies as a function of the temperature and adapted to be put in contact with an area the temperature of which is to be measured, a measuring oscillator directly coupled with said variable resistance element and providing a first frequency depending on the value of said resistance, a reference oscillator providing a second, predetermined reference frequency, means for counting the number of cycles of the first frequency, means including divider means for establishing a base equal to a predetermined number of cycles of said reference frequency, means interconnecting said establishing means and said counting means for counting the number of cycles of said first frequency occurring during said predetermined number of cycles of said second frequency, and digital circuit means for providing an indication of the measured temperature in response to the result provided by the counting means, both oscillators being located immediately adjacent one another, so that any ambient temperature or power supply drift fluctuations simultaneously affects the frequencies of the two oscillators in the same fashion, the result of the counting thereby being substantially unaffected by any said drift fluctuations.

2. An electronic thermometer as set forth in claim 1 wherein said divider means has a plurality of stages the final one which reaches a predetermined digital condition when said predetermined number of cycles is attained, and wherein said interconnecting means is connected to said final stage and stops said counting means when said predetermined condition exists in said final stage.

3. An electronic thermometer as set forth in claim 2 and further including memory means interconnected with said counting means for receiving the count therein when said counting means is stopped, display means for indicating the temperature measured, and decoding means interconnecting said memory means and said display means to effect a display according to the contents of said memory means.

4. An electronic thermometer comprising: a probe body casing ended by a thermoelectric sensor, measuring circuit means coupled with the sensor for providing in the form of a digital data information an indication of the temperature of the sensor, control logic means coupled to the measuring circuit for the control thereof and for receiving the data therefrom, wherein the sensor comprises a variable impedance element of which the value depends on the temperature, wherein the measuring circuit means comprises a first oscillating circuit including said variable impedance element, a second oscillating circuit providing a reference frequency, and means for counting the first frequency, said counting means being controlled by a signal depending on the reference frequency and providing digital data information corresponding to said temperature, and wherein the second oscillating circuit is located closely to and, except for the sensor, is similar to the first oscillating circuit, so that if the frequency of the first oscillating circuit is further influenced by a power supply drift or a thermal drift, the frequency of the second oscillating circuit is then influenced in the same direction by the same drift, the effect of this drift is substantially cancelled, said electronic thermometer further comprising said variable resistance element, control logic means coupled with the counting means for controlling the operation thereof and for receiving the temperature indication therefrom, memory means for receiving and storing said temperature indication, and a self-contained power supply.

5. An electronic thermometer according to claim 4, and further comprising comparator means for periodically comparing said temperature indication with the previously stored temperature indication content of the memory means and, in case the temperature indication exceeds the content, said control logic means causing the input of the temperature indication into the memory, so that the electronic thermometer operates as a maximum thermometer.

* * * * *

UNITED STATES PATENT AND TRADEMARK OFFICE
CERTIFICATE OF CORRECTION

PATENT NO. : 4,371,271

DATED : February 1, 1983

INVENTOR(S) : JEAN-MARIE BELLET

It is certified that error appears in the above-identified patent and that said Letters Patent is hereby corrected as shown below:

Column 3, line 40, after "measurement" insert --in order to establish a base equal to a predetermined number of cycles of the frequency fr--

Column 5, line 56, after "another" insert --and being, except for the variable resistance element, of a similar construction--

Signed and Sealed this

Tenth Day of May 1983

[SEAL]

Attest:

GERALD J. MOSSINGHOFF

Attesting Officer

Commissioner of Patents and Trademarks